3,037,522
Patented June 5, 1962

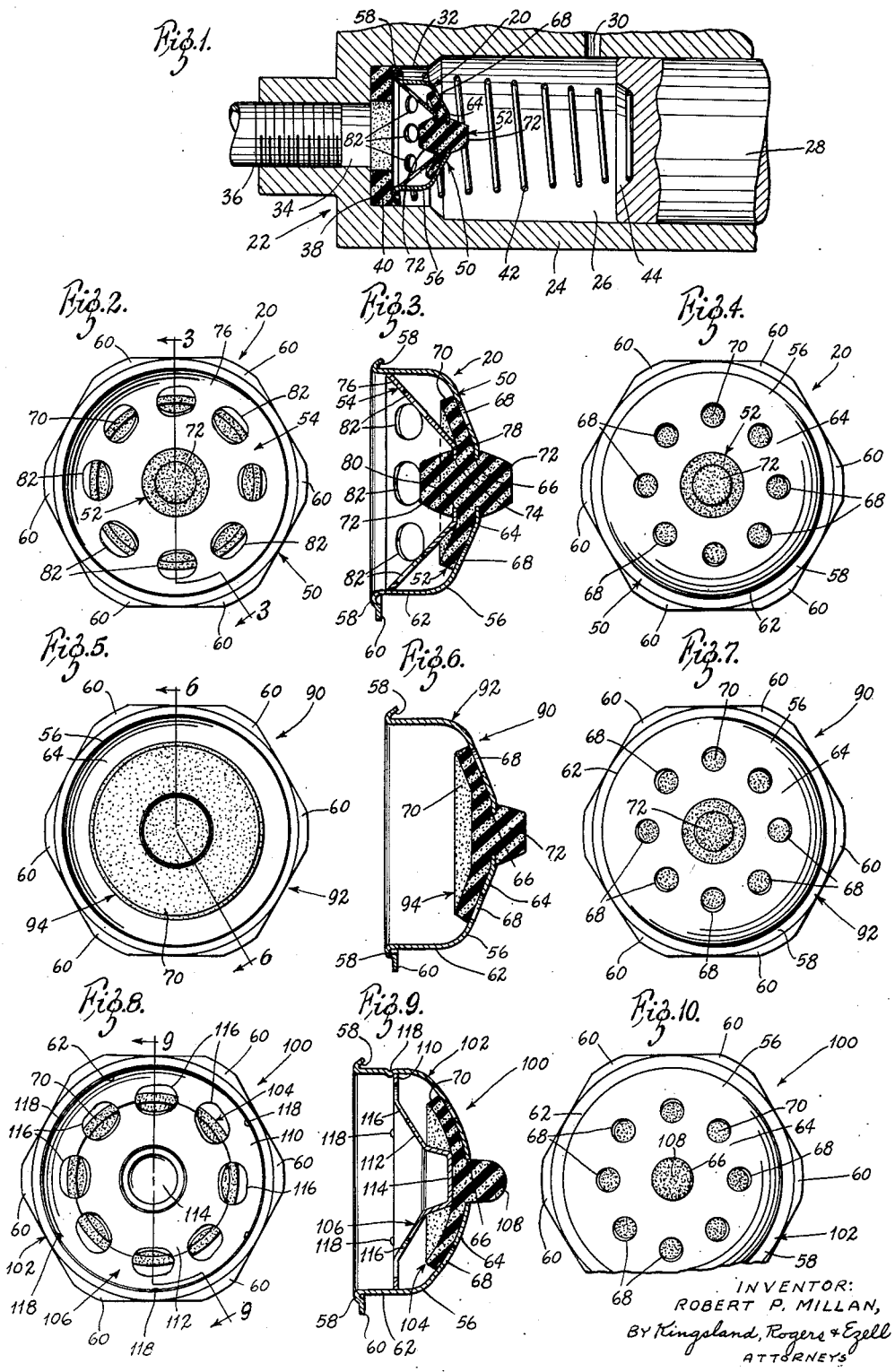

1

3,037,522
CHECK VALVE CONSTRUCTION
Robert Paul Millan, Webster Groves, Mo., assignor to Otto Items, Inc., St. Louis, Mo., a corporation of Missouri
Filed Apr. 4, 1958, Ser. No. 726,508
5 Claims. (Cl. 137—493.2)

The present invention relates generally to devices for controlling the flow of fluids under pressure, and more particularly to a novel check valve arrangement for use in hydraulic braking systems.

The invention contemplates a brake master cylinder construction of generally conventional form wherein a reciprocable piston is enabled to discharge hydraulic fluid through a port located at one end of the cylindrical chamber in which the piston has its movement. The novel check valve is associated with the aforesaid port in a manner to permit substantially unrestricted flow from the piston chamber into the external distributing system, but to resist return flow into the cylinder so as to maintain a predetermined residual pressure in the distributing system. Appropriate means are provided for securing the valve elements against displacement that would block the system.

It is an object of the present invention, therefore, to provide a novel check valve construction which permits two-way flow at respectively different degrees of restriction.

It is another object of the invention to provide a novel two-way check valve which comprises a perforated cup and an imperforate diaphragm.

It is another object of the invention to provide a novel two-way check valve which comprises a perforated cup member having a central aperture for retentive accommodation of a flexible diaphragm.

It is another object of the invention to provide a novel two-way check valve comprising a flexible diaphragm secured against displacement in a manner to block the fluid flow.

The foregoing, along with other objects and advantages, will be apparent from the following description taken in conjunction with the accompanying drawing, in which:

FIGURE 1 is a fragmentary cross section of a hydraulic brake master cylinder incorporating the check valve construction of the present invention;

FIGURE 2 is an enlarged front elevation of the check valve assembly shown in FIGURE 1;

FIGURE 3 is a vertical cross section taken generally along the line 3—3 of FIGURE 2;

FIGURE 4 is an enlarged rear elevation of the check valve assembly shown in FIGURE 1;

FIGURE 5 is a front elevation of a modified form of check valve assembly;

FIGURE 6 is a vertical section taken generally along the line 6—6 of FIGURE 5;

FIGURE 7 is a rear elevation of the modified check valve assembly of FIGURES 5 and 6;

FIGURE 8 is a front elevation of a further modified form of check valve assembly;

FIGURE 9 is a vertical section taken generally along the line 9—9 of FIGURE 8; and FIGURE 10 is a fragmentary rear elevation of the further modified check valve assembly of FIGURES 8 and 9.

Directing particular attention to FIGURE 1, a check valve assembly 20 constructed in accordance with the teachings of the present invention is incorporated in a brake master cylinder shown fragmentarily and generally designated by the numeral 22. The master cylinder assembly 22 includes a conventional body 24 defining a cylindrical bore 26 in which moves a piston 28. A fluid passage 30 communicates the bore 26 with a fluid reservoir (not shown) which normally surmounts the cylinder 26 to enable gravity flow of fluid into the latter. The location of the passage 30 is such that the aforesaid communication is fully effective only when the piston 28 is substantially fully retracted.

The forward end of the cylinder 26 terminates in a valve chamber 32 of somewhat smaller diameter than the bore 26 and having coaxial communication with a port 34 which threadedly receives a pipe 36 connected to a hydraulic distributing system (not shown). An annular shoulder 38 at the junction of the chamber 32 and port 34 accommodates an annular washer 40 constructed of resilient rubber-like material. This washer 40 serves as a seat for the check valve assembly 20. A helical compression spring 42 having one end seated in a recess 44 in the face of the piston 28 engages the valve assembly 20 at its other end in a manner to bias the assembly 20 toward seated engagement with the resilient washer 40.

The check valve assembly 20 depicted in FIGURE 1 is shown in enlarged scale in FIGURES 2, 3 and 4. It comprises a cup-like cage 50, a resilient diaphragm 52, and a retainer 54. The cage 50 has a circular bowl portion 56 which terminates in an outwardly flanged rim 58 of arcuate cross section for accommodation of the associated spring 42. The rim 58 is provided with radially extended centering tabs 60 spaced equidistantly about its periphery.

Although not required in the present invention, it is preferable that the bowl portion 56 of the cage 50 have a generally straight sided or cylindrical section 62 adjacent the rim 58, the bowl or cup shape being thereafter completed in a symmetrical cross section of any suitable shape, such as that depicted at 64 in the drawing.

The bowl portion 56 of the cage 50 has a central aperture 66 of circular shape and, in addition, is provided with a plurality of perforations 68 spaced in a circle around the central opening 66. The perforations 68 are located appreciably closer to the aperture 66 than to the open rim of the cage 50, being preferably formed in the area 64 of the bowl portion 56.

The diaphragm 52 is constructed of resilient rubber-like material and is preferably molded in one piece to a symmetrical circular form comprising a flat disc portion 70 having identical oppositely extending broad-based protuberances, projections or hubs 72. A ring-like inwardly extending groove 74 is formed at the base of each protuberance 72 where it joins the disc portion 70, the inner diameter of the grooves 74 being substantially the same as the diameter of the central aperture 66 in the cage 50. The over-all diameter of the disc portion 70 is such as to enable this portion to extend over and beyond the perforations 68 when the diaphragm 52 and the cage 50 are assembled together as clearly shown in FIGURE 3.

The retainer 54 comprises a frusto-conical section or frame 76 terminating at its smaller end in an inwardly extending annular flange 78 which defines a circular opening 80 of a diameter to fit one of the grooves 74 in the diaphragm 52, thereby providing means for locking the retainer to the adjacent hub 72. The larger end of the frusto-conical section 76 is such as to provide a sliding fit within the straight-sided section 62 of the cage 50. The retainer 54 is provided with a plurality of perforations 82 arranged in a circle and located sufficiently far from the flanged inner end of the frusto-conical section 76 to avoid appreciable overlap of the perforations 82 by the disc portion 70 of the diaphragm 52 when the parts are assembled as illustrated in the drawing.

A modified form of check valve assembly, designated generally by the numeral 90, is depicted in FIGURES 5, 6 and 7. The assembly 90 differs from the above described check valve assembly 20 primarily in that it has no member which corresponds to the retainer 54. Thus, the assembly 90 comprises a cage member 92, which may be in all respects identical with the previously described cage 50, and a diaphragm 94 which differs from the aforesaid diaphragm 54 only in having but a single protuberance 72. The parts 92 and 94 of the valve assembly 90 are assembled as clearly shown in FIGURE 6.

A further modified form of check valve assembly, designated generally by the numeral 100, is depicted in FIGURES 8, 9 and 10. The assembly 100 comprises a cup-like cage member 102, a flexible diaphragm 104, and a retainer 106. The cage member 102 may, as does the member 92, take the general form of the originally described cage 50. The diaphragm 104 differs from the diaphragm 54 only in having a narrow-based protuberance 108 in place of the previously described broad-based protuberance 72 and in having no groove which would correspond to the grooves 74 of the diaphragms 52 and 94.

The retainer 106 is generally dish-shaped. As illustrated, it has a peripheral portion which defines a flat annulus 110 adapted to fit within the cylindrical section 62 of the cage 102, and it has a central portion depressed out of the plane of the annulus 110 so as to define an intermediate section 112 and a flat center disc 114. The diameter of the disc 114 is preferably slightly greater than the diameter of the central aperture 66 in the cage 102. The intermediate section 112 which joins the disc 114 and annulus 110 is preferably formed to a suitable generally concave outside configuration so as to provide space for movement of the disc portion 70 of the flexible diaphragm 104 when the parts are assembled as illustrated in FIGURE 9 of the drawing. A plurality of perforations 116 is formed in the outer area of the intermediate section 112 so as at all times to avoid overlap by the diaphragm portion 70 and may extend partially into the annulus 110 as shown. In assembled arrangement, the disc 114 is emplaced firmly against the side of the diaphragm 104 opposite the protuberance 108, this relationship being maintained by staking the cage portion 62 at peripherally spaced points adjacent the retainer annulus 110 as shown at 118 in the drawing.

In use, the check valve assemblies 20, 90, and 100 provide identical functions of fluid flow, and, notwithstanding the fact that the assembly 20 alone is shown incorporated in the brake master cylinder 22, it should be understood that either of the assemblies 90 and 100 could be substituted for the assembly 20.

Thus, assuming the master cylinder 22 to form part of a braking system filled with hydraulic fluid, it is evident that advancement of the piston 28 to the left, as illustrated, will first close off the passage 30 and thereafter develop increased pressure within the bore 26 and the chamber 32. This increased pressure is freely communicated through the perforations 68 and flexible diaphragm portion 70 of whichever of the assemblies 20, 90 or 100 happens to be disposed in the chamber 32, and it is obvious that fluid may flow without restriction from the cylinder 26 through the particular valve assembly and the port 34 into the distributing pipe 36. The perforations 82 or 116 in the respective retainers 54 and 106 will not, of course, obstruct fluid flow in either direction.

Upon eventual release of the force which advances the piston 28, the compression spring 42 returns it to its retracted position and thereby reduces the pressure in the cylinder 26 to no more than its previous low degree so that at least some of the hydraulic fluid under pressure in the pipe 36 may be returned to the cylinder 26 by conventional spring returned wheel pistons (not shown). Inasmuch, however, as any tendency towards return flow of the fluid causes the flexible diaphragm disc 70 to close off the cage perforations 68, it is evident that such flow can take place only as long as sufficient pressure exists forwardly of the valve assembly to move the cage rim 58 away from the washer 40 against the force of the spring 42. With the valve assembly thus displaced, fluid may flow around the outside of the rim 58 between the tabs 60 into the chamber 32 and thence into the cylinder 26. When the fluid pressure in the pipe 36 drops to a point which corresponds to the force of the spring 42, the particular valve assembly 20, 90 or 100 will prevent further return flow by once more occupying a seat against the resilient washer 40.

Inasmuch as it is evident from a study of FIGURE 1 that inadvertent displacement of the diaphragm 52 from its normal juxtaposition with the section 64 of the bowl portion 56 would, in the absence of the retainer 54, very likely result in blocking the port 34 and thereby preventing effective operation of the associated brakes, it is clearly necessary to take appropriate precaution against such a contingency. In this connection it has been found by tests that the above-described engagement of the central aperture portions of the cages 50 and 92 with the grooves 66 at the base of the diaphragm protuberances 72 provides very little likelihood of inadvertent displacement. Nevertheless, the possibility, however remote, of the port 34 becoming thus blocked is obviated by the employment in the assemblies 20 and 100 of the respective retainers 54 and 106. The retainer 54, attached only to the diaphragm 52 would, in the event of the latter being displaced from the aperture 66, serve as a guard for the port 34. The retainer 106, being itself retained against displacement by staking, maintains the diaphragm 104 in assembled position, and, even though the staking should prove ineffective, would still serve as a guard for the port 34.

The solid, nonperforated diaphragms 52, 94, and 104 each with an integral protuberance extending through a central cage aperture 66 have proved particularly effective in preventing reverse flow leakage through the interior of their respective cages, presumably through a concentrated pressure engagement with the edge of the apertures 66.

Clearly, there have been described a variety of check valve constructions which fulfill the objects and advantages sought therefor.

It is to be understood that the foregoing description and the accompanying drawing have been given only by way of illustration and example. It is to be further understood that changes in the form of the elements, rearrangement of parts, or the substitution of equivalent elements, all of which will be apparent to those skilled in the art, are contemplated as being within the scope of the invention, which is limited only by the claims which follow.

What is claimed is:

1. A check valve structure for a valve assembly having flow alternately in a first direction and an opposite direction comprising: a cup-like cage having a rim for seating upon a valve seat during flow in the first direction and during flow in the second direction below a predetermined pressure; said cage having apertures and an opening in its body; a flexible imperforate diaphragm having a projected portion for extending through the opening from the rim side thereof; said diaphragm having a fluid-tight skirt radiating from the projected portion beyond the aperture so as to cover them and prevent fluid flow through the apertures in said opposite direction; and means retaining said projected portion extended through said opening during flow in the first direction whereby flow in said first direction is through the apertures and past the periphery of the diaphragm, said diaphragm having a hub opposite the projection; said retaining means including a ring surrounding the hub so as to securely maintain the projected portion within the opening.

2. A device for use in a valve assembly comprising: a cup-like cage having a rim at one end, an opening at an opposite end and a perforated body therebetween; a fluid-impervious diaphragm having a projection for extension through said opening and a skirt depending from the projection for covering the perforated portion of the body; and means for retaining the diaphragm in position with its projection within the opening, the means for retaining the diaphragm comprising a frame locked between the cage body and the diaphragm, the retaining frame having a perforation in it and the diaphragm having a second projection opposite the first one for projecting through the perforation in the retaining frame the second projection being resilient and being larger than the perforation so that a portion of the second projection on the side of the perforation opposite the diaphragm bears against portions of the retaining frame surrounding the perforation.

3. A device for use in a valve assembly comprising: a cup-like cage having a rim at one end, an opening at an opposite end and a perforated body therebetween; a fluid-impervious diaphragm having a projection for extension through said opening and a skirt depending from the projection for covering the perforated portion of the body; and means for retaining the diaphragm in position with its projection within the opening; the retaining means comprising a retainer member having a hollow, open-ended, generally frusto-conical configuration and being provided with a plurality of perforations, the small open end of the retainer member having an inwardly extending annular flange, the aforesaid flexible diaphragm having a second axial projection in opposed axial extension to the first-mentioned projection, said second projection having an annular groove at its base for interfitting accommodation of the annular flange on the retainer member.

4. The combination of claim 3 wherein the retaining means comprises a groove surrounding the base of the first named projection for interfitting accommodation of the inner edge of that portion of the cage member which defines the opening.

5. A check valve comprising a cage member of generally open-ended cup-like form, an aperture through the side of the cage opposite the open end, fluid passage means through the cage, a flexible imperforate diaphragm large enough to cover all the holes, the diaphragm having a projection from one side locked within the aperture, a diaphrgam retainer, and means for locking the diaphragm retainer to the side of the diaphragm opposite the projection, the locking means including means on the diaphragm for engaging the retainer to prevent the retainer from moving away from the diaphragm, the engaging means comprising a second projection on the side of the diaphragm opposite the first named projection, an aperture in the retainer for receiving the second projection, the diameter of the retainer aperture being smaller than the largest diameter of that portion of the second projection which is spaced from the diaphragm by the retainer, the second projection having groove means adjacent the retainer aperture, the retainer having flange means adjacent the aperture and fitted into the groove means.

References Cited in the file of this patent
UNITED STATES PATENTS

| | | |
|---|---|---|
| 2,008,818 | Corbett | July 23, 1935 |
| 2,291,603 | Barker | Aug. 4, 1942 |
| 2,620,133 | Obermaier | Dec. 2, 1952 |
| 2,663,540 | Erickson | Dec. 22, 1953 |
| 2,688,978 | Wangenheim | Sept. 14, 1954 |
| 2,747,922 | Gibson | May 29, 1956 |